(No Model.)
E. P. WARNER.
ELECTRIC SWITCH.
No. 425,963. Patented Apr. 15, 1890.
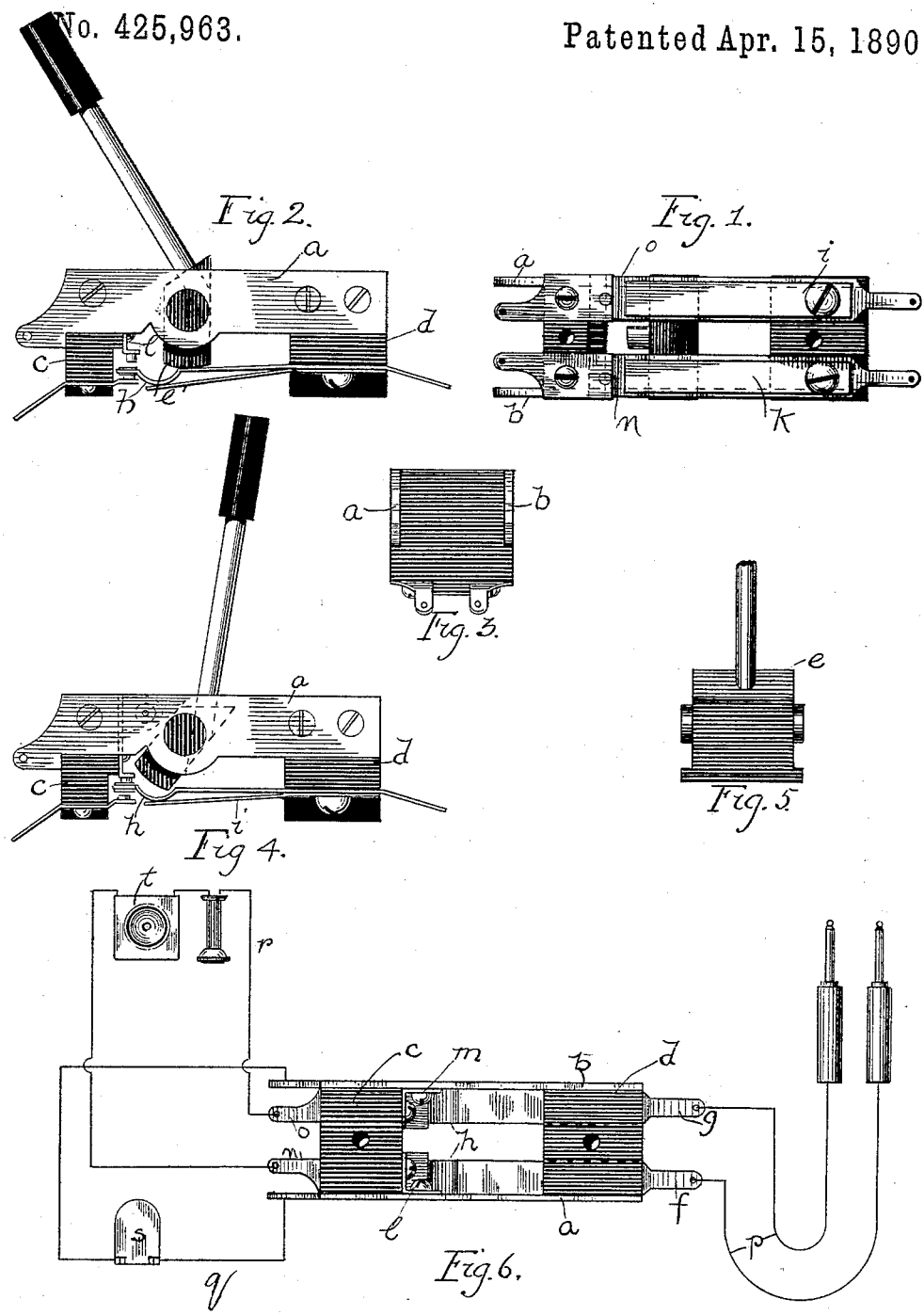
Witnesses:
Chas. G. Hawley.
Geo. R. Parker.
Inventor:
Ernest P. Warner.
By George P. Barton Attorney.

UNITED STATES PATENT OFFICE.

ERNEST P. WARNER, OF CHICAGO, ILLINOIS.

ELECTRIC SWITCH.

SPECIFICATION forming part of Letters Patent No. 425,963, dated April 15, 1890.

Application filed February 2, 1889. Serial No. 298,491. (No model.)

*To all whom it may concern:*

Be it known that I, ERNEST P. WARNER, a citizen of the United States, residing at Chicago, in the county of Cook and State of Illinois, have invented a certain new and useful Improvement in Electric Switches, (Case 22,) of which the following is a full, clear, concise, and exact description, reference being had to the accompanying drawings, forming a part of this specification.

My invention relates to switches, and is especially designed for use in connection with a pair of cords, a telephone, and a clearing-out annunciator, the object being to connect the telephone or the clearing-out annunciator into the circuit of the cords at the will of the operator. Various forms of circuit-changers have been heretofore used for doing this work, and yet no entirely satisfactory device has been found. Switches used in connection with the operator's outfit are almost constantly in use, and it is of the greatest importance that they should be easily operated, positive in their action, and durable.

My invention is designed to meet these requirements; and the principal features of my invention consist, first, in the metal side pieces mounted upon rubber blocks placed between them, said metal side pieces being provided with bearings for the trunnions of the pivoted concentric rubber block, in combination with contact-pieces and contact springs or levers, said contact springs or levers being provided with inclined or curved surfaces placed in proximity to the concentric surface of the pivoted rubber piece; second, in the movable levers and re-enforcing springs and the contacts at the free ends of the movable lever, a block of rubber provided with a concentric surface and trunnions resting in metallic bearings, and a lever or handle for rotating or turning said rubber block against the levers to change their position, so as to separate them from one set of contacts and hold them firmly pressed against another set of contacts; and, third, in the frame embracing the side pieces, of brass or other metal, the rubber blocks between the ends of the side pieces, in combination with the pivoted piece between the blocks having its trunnions resting in bearings provided in the side pieces, and the springs and contacts mounted upon the rubber blocks below, the surface of the pivoted block and the corresponding surface of the springs being at different angles, so that the pivoted piece on being moved against the springs act as a cam to change the position of the springs.

My invention will be readily understood by reference to the accompanying drawings, in which—

Figure 1 is a view of my switch from below. Fig. 2 is a side elevation thereof, showing the lever and pivoted block turned in position to force the contact-springs against the lower contact-points. Fig. 3 is an end elevation thereof. Fig. 4 is a side elevation showing the switch in its normal position. Fig. 5 is a detailed view of the pivoted rubber block, the lever or handle thereof being broken off. Fig. 6 is a plan view of the switch, the pivoted piece shown in Fig. 5 being removed, in connection with a pair of cords, a telephone, and a clearing-out annunciator.

Like parts are indicated by similar letters of reference in the different figures.

The parallel side pieces $a\ b$ are secured to rubber blocks $c\ d$, placed between them. In the space between the blocks $d\ d$, I place a rubber piece $e$. This rubber piece is provided with trunnions, which rest in bearings provided in the opposite parallel side pieces $a\ b$. This piece $e$ is preferably of the form shown, its working-surface $e'$ being concentric with its axis of rotation—that is to say, the piece $e$ might be considered as cut from a cylinder, the center of the trunnions being the axis of the cylinder and the working-surface $e'$ a portion of the surface of the cylinder.

Springs $f$ and $g$ are mounted upon the under side of block $d$ and are bent at $h$ below the surface $e'$, preferably as shown. Re-enforce springs $i\ k$ are provided below the springs $f\ g$, their tension being such that their free ends will constantly press against the under side of the bent portion $h$ of the contact-springs $f\ g$, respectively. The upper contact-points are preferably provided upon the lower portions of the angle-pieces $l\ m$. The lower contact-points $n\ o$ are mounted upon the lower side of the block $c$.

As shown in Fig. 6, the circuit $p$ of the pair of plugs is connected with the springs or levers $f\ g$. The circuit $q$ of the clearing-out annunciator is connected with the side pieces *a b*, which are respectively in connection with the upper contacts carried on angle-pieces *l m*. The circuit *r* of the telephone connects with the lower contacts *n o*.

From the foregoing description the operation of my switch will be readily understood. Suppose the plugs connected with the switches of two telephone-lines. When the switch is in the position shown in Fig. 2, the telephone *t* will be included in circuit with the circuit *p* of the cords. On bringing the lever forward to the position shown in Fig. 4, the springs *f g* will close upon the upper contact so as to loop the clearing-out annunciator *s* into circuit. When the surface *e'* has passed by the inclined surface or bent portion *h* of the contact-springs, the springs will be firmly held against the lower contact and there will be no tendency on the part of said springs to rotate the piece *e*, as would be the case if surface *e* were eccentric or in the form of a cam proper.

The side pieces *a b* may be stamped out of sheets of brass. The trunnions, as well as the surface *e'*, being of rubber, and the bearings in the side pieces *a b* and the working-surface *h* of the springs being of metal, the friction is reduced to the minimum and no lubrication is required.

Having thus described my invention, I claim as new and desire to secure by Letters Patent—

1. The combination, with the metal side pieces mounted upon rubber blocks placed between them, of the pivoted rubber block provided with the concentric surface, the trunnions or pivots of said pivoted block resting in bearings provided in the metal side pieces, contact springs or levers bent, as indicated at *h*, in proximity to the concentric surface, and upper and lower contact-points, between which the contact-springs are adapted to be moved, substantially as and for the purpose specified.

2. The combination, with the movable levers provided with re-enforcing springs, of the contacts at the free ends of the movable levers, a block of rubber provided with a concentric surface and trunnions, the trunnions resting in metallic bearings, and the concentric surface being adapted to take the bent or inclined portion or surface of the levers, whereby the position of the springs or levers may be changed to separate them from one set of contacts and hold them firmly pressed against another set of contacts, substantially as and for the purpose specified.

3. The combination, with the frame, which includes the side pieces of metal, and the rubber blocks placed between the ends of the same so as to leave a space between the said rubber blocks, of a pivoted piece between the blocks having its trunnions or pivots resting in bearings provided in the side pieces, and the springs and contacts mounted upon the rubber blocks below, the surface of the pivoted block and the corresponding surface of the springs or levers being at different angles, whereby the pivoted piece on being moved in one direction is brought against the springs or levers and forces them against their tension to change their position and holds them firmly, while on moving the pivoted piece back the springs by their own tension are carried to their first position, substantially as and for the purpose specified.

In witness whereof I hereunto subscribe my name this 15th day of September, A. D. 1888.

ERNEST P. WARNER.

Witnesses:
CHAS. G. HAWLEY,
GEORGE P. BARTON.